D. C. DAVIS.
VIBRATING RECTIFIER.
APPLICATION FILED JUNE 11, 1915.
1,184,230.
Patented May 23, 1916.
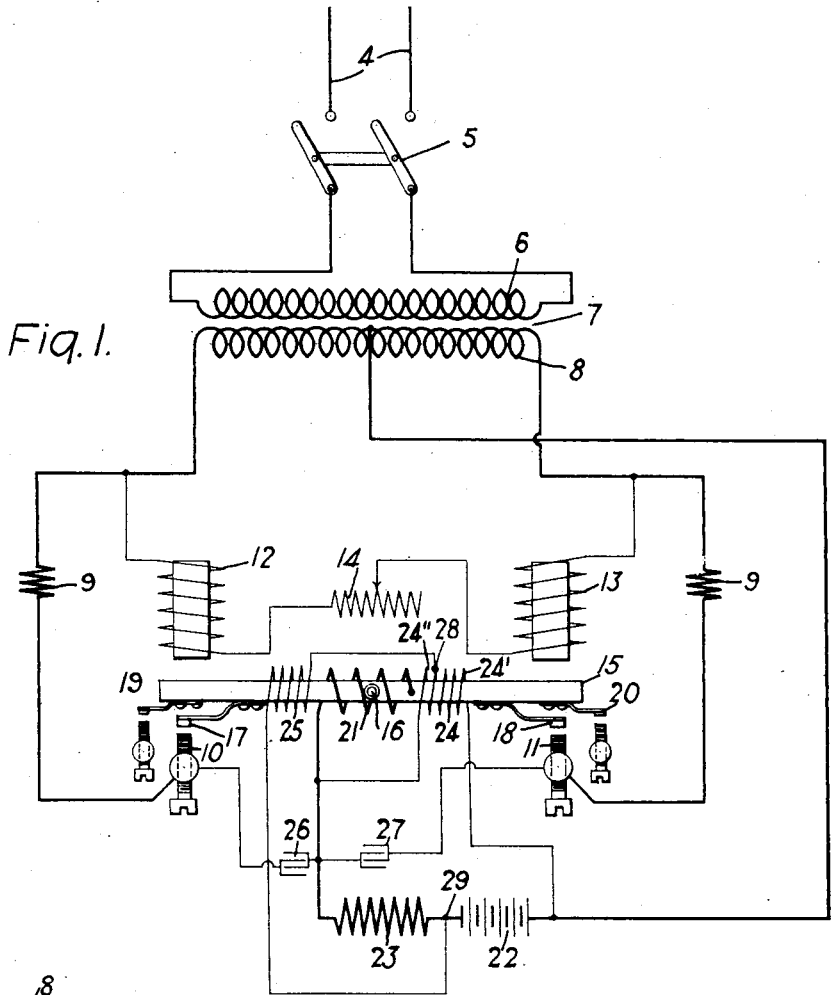
Fig. 1.
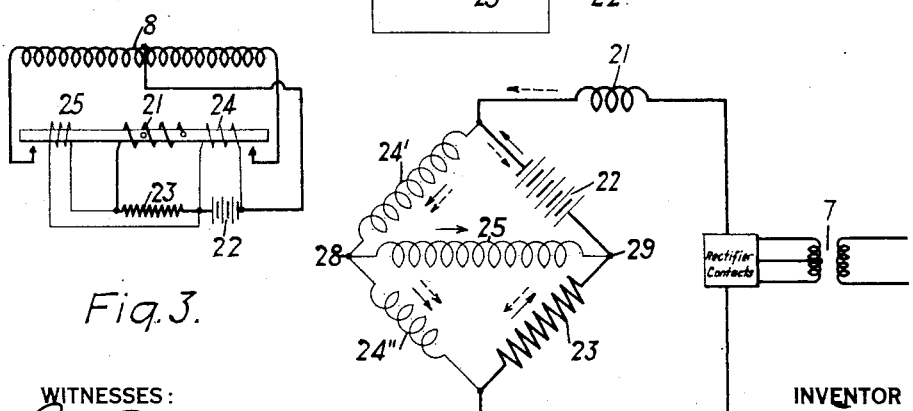
Fig. 3.
Fig. 2.
WITNESSES:
INVENTOR
David C. Davis.
BY
ATTORNEY

UNITED STATES PATENT OFFICE.

DAVID C. DAVIS, OF SWISSVALE, PENNSYLVANIA, ASSIGNOR TO WESTINGHOUSE ELECTRIC AND MANUFACTURING COMPANY, A CORPORATION OF PENNSYLVANIA.

VIBRATING RECTIFIER.

1,184,230. Specification of Letters Patent. Patented May 23, 1916.

Application filed June 11, 1915. Serial No. 33,480.

*To all whom it may concern:*

Be it known that I, DAVID C. DAVIS, a citizen of the United States, and a resident of Swissvale, in the county of Allegheny and State of Pennsylvania, have invented a new and useful Improvement in Vibrating Rectifiers, of which the following is a specification.

My invention relates to rectifiers of the mechanical or vibrating type which are provided with compound windings in order to insure desirable operating characteristics.

My invention has for its object to provide means whereby a device of the character described may develop a strong and positive starting operation.

In the accompanying drawing, Figure 1 is a diagrammatic view of a mechanical rectifier, together with its attendant supply and load circuits, constructed in accordance with the preferred form of my invention; Fig. 2 is a diagram illustrating the operation of the device shown in Fig. 1; and Fig. 3 is a diagrammatic view of a rectifier embodying a modified form of my invention.

In a copending application for U. S. patent, filed by Quincy A. Brackett on April 3, 1914, Serial No. 829,194 and assigned to the Westinghouse Electric & Manufacturing Company is disclosed a compound-wound mechanical rectifier which has exceptionally good operating characteristics. Under certain conditions of load, however, the rectifier disclosed in said application starts with difficulty because of the fact that the series operating winding is not excited until load current begins to flow, and entire dependence must be placed upon the shunt operating winding, deriving current from the load battery. By my invention, I provide an auxiliary operating winding to supplement the action of the shunt winding until the device is in normal operation and the series operating winding is properly energized. Inasmuch as further inclusion of the auxiliary winding in the circuit would produce a total operating flux of excessive power, the action of the auxiliary winding is nullified by suitable means, preferably without the use of relays or like devices having inherent uncertainty of operation.

Briefly stated, my invention comprises arranging a Wheatstone bridge within the rectifier circuits, two arms of said Wheatstone bridge being provided by the load battery and the ballast resistance commonly employed with devices of this character, and the two remaining arms being provided by suitable portions of the shunt-operating winding. The load current is supplied to the two diagonally opposite corners of the bridge where the shunt winding joins the main load circuit, and the auxiliary winding is connected between the two-remaining corners of the bridge. At the outset, before rectification commences, current from the battery flows around through the bridge, energizing the shunt winding and the auxiliary winding, thus developing sufficient magnetic flux to quickly and effectively start the device into operation. When the flow of load current commences, a portion thereof flows through the battery and ballast resistance and the remainder through the shunt field winding, the drops in the two sides of the bridge being so adjusted that little or no current flows in the auxiliary winding. The action of the auxiliary winding is therefore nullified without the use of any moving contacts or similar apparatus.

Referring to the drawing for a more detailed understanding of my invention, single-phase alternating current from any suitable source is supplied, through mains 4—4 and a switch 5, to the primary winding 6 of a transformer 7. Alternating current from the secondary winding 8 of the transformer 7 is supplied, through suitable ballast resistances 9—9, to fixed contact members 10 and 11. Current from the secondary winding 8 is also supplied to suitable alternating-current driving magnets 12 and 13 through a phase-adjusting device 14. A bar 15 of magnetic material is pivotally mounted, at a point 16, so that its ends are adjacent to the pole faces of the driving magnets 12 and 13. The bar 15 carries spring-mounted contact members 17 and 18 that are adapted to coact, respectively, with the fixed contact members 10 and 11, and also carries suitable control springs 19 and 20. A series direct-current exciting winding 21 is mounted to embrace the bar 15 and may either be carried by the bar or be fixed in position and of sufficient size to allow free movement of the bar therein. One terminal of the series winding 21 is connected to the bar 15 and the other terminal thereof is connected to a load battery 22 through a ballast-resistance device 23. The ballast devices 9—9 are preferably made smaller than has hitherto been customary, in order that the ballast device 23 may be introduced without undue loss. A shunt direct-current exciting winding 24 is mounted to embrace the bar 15 and is connected across the outer terminals of the battery 22 and of the ballast device 23. An auxiliary direct-current exciting winding 25 is also mounted to embrace the bar 15 and is connected between an intermediate point 28 in the winding 24 and the junction point 29 of the battery 22 and of the device 23. Suitable condensers 26 and 27 may be connected between the contact members 10 and 11 and the load circuit to minimize sparking.

Having thus described the structure of my rectifier, the operation is as follows: Upon closing the switch 5 and connecting the battery 22 to the rectifier, alternating current will flow through the windings 12 and 13, providing an alternating operating field, and current from the battery 22 will traverse the windings 24 and 25, as will be explained hereinafter more in detail, producing a unidirectional magnetic flux in the bar 15. The interaction between the alternating and the unidirectional magnetic fluxes thus produced sets the bar 15 in synchronous vibration, whereupon the successive closures of the circuit at the contact members 10—17, 11—18 initiates rectification, as is well known in the art.

Referring to Fig. 2 for a more detailed understanding of the method of development of the unidirectional magnetic flux, it will be seen that the battery 22 and the ballast device 23 form two arms of a Wheatstone bridge. The portion of the winding 24 lying to the right of the junction point 28 in Fig. 1 forms another arm 24' of the bridge and the remainder of the winding 24 forms the remaining arm 24''. The load-current circuit is connected to the upper and lower corners of the bridge and the auxiliary winding 25 is connected across the remaining corners. At the outset, current flows from the battery 22 as indicated by the full line arrows and energizes the windings 24', 24'' and 25, which all assist each other. When rectification commences, the load current flows as indicated by the dotted arrows, and the action of the winding 25 is nullified because the relative numbers of turns in the windings 24' and 24'' are so chosen that the points 28 and 29 assume substantially equal potentials. The series winding 21 having taken up the excitation, however, normal operation is now possible.

Referring to the form of my invention shown in Fig. 3, a rectifier of the general character shown in Fig. 1 is employed. The shunt winding 24 is provided with such number of turns that it is able to successfully start the rectifier into operation when energized by the battery 22. The auxiliary winding 25 is connected across the terminals of the ballast device 23 and is wound to oppose the winding 24, although weaker in effect. At the outset, the winding 24 is energized from the battery 22, and no current flows in the winding 25 because no load current is flowing through the ballast device 23. When, however, the flow of load current is initiated, the voltage drop in the device 23 causes current to flow through the winding 25, weakening the effect of the windings 21 and 24 to such an extent that the desired operating flux is provided.

While I have shown my invention in two of its preferred forms, it will be obvious to those skilled in the art that it is susceptible of various minor changes and modifications without departing from the spirit thereof, and I desire, therefore, that no limitations shall be placed thereupon except such as are imposed by the prior art or are specifically set forth in the appended claims.

I claim as my invention:

1. The combination with a vibrating rectifier, of means for providing an auxiliary operating magnetic flux during the starting period.

2. The combination with a compound-wound vibrating rectifier, of auxiliary means for supplying operating magnetic flux until the series winding becomes operative and for then eliminating said auxiliary flux.

3. The combination with a source of back electromotive force, of a compound-wound mechanical rectifier connected to supply energy thereto from a source of alternating current, said rectifier including a resistance member in series with said load, a shunt operating winding connected across said load and said resistance member, and an auxiliary driving winding connected from the junction of said load and said resistance member to a point in said shunt winding having a like potential during normal operation.

4. A battery-charging system employing mechanical rectifiers wherein the battery and ballast-resistance member are connected to form two arms of a Wheatstone bridge, two portions of an operating winding are connected to form the two remaining arms, the rectified current is supplied to two diagonally opposite corners of the bridge, and an auxiliary operating winding is connected across the two remaining corners.

5. The combination with a self-operating compound-wound electrical device, of means for causing said device to operate prior to the energization of the series winding by load current, comprising an auxiliary winding connected between two points of said device which are at different potentials prior to the flow of load current and at substantially equal potentials when load current flows.

6. The combination with a self-operating compound-wound electrical device, of means for causing said device to operate prior to the energization of the series winding by load current, said means comprising a Wheatstone bridge having the load circuit connected to two diagonally opposite corners thereof and having an auxiliary operating winding connected between the remaining corners thereof.

In testimony whereof, I have hereunto subscribed my name this 28th day of May 1915.

DAVID C. DAVIS.

Copies of this patent may be obtained for five cents each, by addressing the "Commissioner of Patents, Washington, D. C."